United States Patent
Inturi et al.

(10) Patent No.: US 6,342,311 B1
(45) Date of Patent: Jan. 29, 2002

(54) HIGH MAGNETIC MOMENT SEED LAYER MATERIALS FOR WRITER POLE TIPS

(75) Inventors: Venkateswara R. Inturi, Eden Prairie; Martin L. Plumer; Charles H. Tolman, both of Bloomington; Steve Riemer, Minneapolis; Ibro Tabakovic, Edina; Steven B. Slade, Chanhassen, all of MN (US)

(73) Assignee: Seagate Technology, Inc., Scotts Valley, CA (US)

( * ) Notice: Subject to any disclaimer, the term of this patent is extended or adjusted under 35 U.S.C. 154(b) by 0 days.

(21) Appl. No.: 09/588,394

(22) Filed: Jun. 6, 2000

Related U.S. Application Data

(60) Provisional application No. 60/158,524, filed on Oct. 8, 1999.

(51) Int. Cl.$^7$ ................................................. G11B 5/66
(52) U.S. Cl. ............ 428/692; 428/694 R; 428/694 TM; 428/694 TS; 428/900; 360/113; 360/128
(58) Field of Search ................................ 428/692, 694 R, 428/694 TM, 694 TS, 800; 360/113, 128

(56) References Cited

U.S. PATENT DOCUMENTS

| | | | |
|---|---|---|---|
| 4,780,781 A | 10/1988 | Sano et al. | 360/126 |
| 5,057,380 A | 10/1991 | Hayashi et al. | 428/692 |
| 5,091,266 A | 2/1992 | Omata | 428/692 |
| 5,287,239 A | 2/1994 | Iwasaki | 360/126 |
| 5,543,989 A | 8/1996 | Westwood | 360/113 |
| 5,571,573 A | 11/1996 | Shukovsky et al. | 427/531 |
| 5,582,927 A | 12/1996 | Andricacos et al. | 428/694 T |
| 5,751,526 A | * 5/1998 | Schemmel | 360/113 |
| 5,843,521 A | * 12/1998 | Ju | 427/129 |

OTHER PUBLICATIONS

M.G. Fontana, *Corrosion Engineering*, McGraw–Hill series, 1986, PP226–229.

V.R. Inturi et al., Effect of Base Layers on the Soft Magnetic Properties of FeTaN Films, *J. Appl. Phys.*, vol. 79, Apr. 1996, PP5904–5906.

R.M. Bozorth, *Ferromagnetism*, Published D. Van Nostrand, 1978, PP165–166.

K.G. Ashar, Magnetic Disk Drive Technology: Heads, Media, Channel, Interfaces, and Integration, IEEE Magnetics Society, 1997, PP97–100; 111–113.

* cited by examiner

*Primary Examiner*—Leszek Kiliman
(74) *Attorney, Agent, or Firm*—Kinney & Lange, P.A.

(57) ABSTRACT

A magnetic recording head has a magnetic pole tip and a seed layer upon which the magnetic pole tip is formed. The seed layer is preferably formed of a high magnetic moment material having a saturation magnetization of at least 1.8 Tesla and a high resistance to corrosion. In preferred embodiments of the present invention, the seed layer is preferably formed of 2.1 Tesla $Fe_{44-46}Co_{39-41}Ni_{14.5-15}$, 1.8 Tesla $Fe_{54-56}Ni_{27-29}Co_{16-18}$ Tesla $Fe_{86-90}Cr_{10-14}$, or 1.9 Tesla $Fe_{52-62}Co_{26-36}Cr_{10-14}$, wherein the subscripts indicate a preferred range of atomic percentages for each element in the given alloy.

25 Claims, 2 Drawing Sheets

HIGH MAGNETIC MOMENT SEED LAYER MATERIALS FOR WRITER POLE TIPS

CROSS-REFERENCE TO RELATED APPLICATION(S)

This Application claims priority from provisional application No. 60/158,524, filed Oct. 8, 1999 for "2.1 T $Fe_{45}Co_{40}Ni_{15}$ Seed Layer for Writer Pole Materials" of Venkateswara R. Inturi, Martin L. Plumer, Charles H. Tolman, Steve Riemer, Ibro Tabakovic, and Steven B. Slade.

BACKGROUND OF THE INVENTION

The present invention relates generally to the field of magnetic data ea storage and retrieval. In particular, the present invention relates to high magnetic moment seed layer materials for use in forming a writer pole tip.

A typical magnetic recording head consists of two portions: a writer portion for storing magnetically-encoded information on a magnetic disc and a reader portion for retrieving that magnetically-encoded information from the disc. The reader typically consists of two shields and a magnetoresistive (MR) sensor positioned between the shields. Magnetic flux from the surface of the disc causes rotation of the magnetization vector of a sensing layer of the MR sensor, which in turn causes a change in electrical resistivity of the MR sensor. This change in resistivity of the MR sensor can be detected by passing a current through the MR sensor and measuring a voltage across the MR sensor. External circuitry then converts the voltage information into an appropriate format and manipulates that information as necessary.

The writer typically consists of two magnetic poles separated from each other at an air bearing surface of the write head by a write gap and connected to each other at a region away from the air bearing surface by a back via. Positioned between the two poles are one or more layers of conductive coils encapsulated by insulating layers. The writer and the reader are often arranged in a merged configuration in which a shared pole serves as both a shield in the reader and a magnetic pole in the writer To write data to the magnetic media, a time-varying electrical current, or write current, is caused to flow through the conductive coils. The write current produces a time-varying magnetic field in the magnetic poles. The magnetic field bridges the write gap forming a write gap field. The magnetic media is passed over the air bearing surface of the writer at a predetermined distance such that the magnetic surface of the media passes through the gap field. As the write current changes, the write gap field changes in intensity and direction.

Recent years have seen a considerable increase in data storage densities. Generally, the data storage capacity of a magnetic data storage and retrieval device is increased through use of a magnetic media having an increased areal density, which is the number of units of data stored in a unit area of the media. Areal density is determined by two components of the magnetic media: the track density (the number of data tracks per unit width of the magnetic media) and the linear density (the number of units of data stored per unit length of a data track). To increase the areal density of a magnetic media, one must increase the linear density and/or the track density of the magnetic media.

Increases in areal density have been achieved by increasing the strength of the write gap field, decreasing the thickness of the gap between the magnetic poles at the air bearing surface, decreasing the width of the writer poles at the air bearing surface and increasing the coercivity of the magnetic media. These improvements require the material of the magnetic poles to conduct relatively high flux densities, especially those portions of the poles, i.e., the pole tips, which are adjacent to the gap. However, materials have a saturation level beyond which they will conduct no more flux. Accordingly, there is a need for a pole tip materials which have high saturation moments.

BRIEF SUMMARY OF THE INVENTION

A magnetic recording head has a magnetic pole tip and a seed layer upon which the magnetic pole tip is formed. The seed layer is preferably formed of a high magnetic moment material having a saturation magnetization of at least 1.8 Tesla and a high resistance to corrosion. In preferred embodiments of the present invention, the seed layer is preferably formed of 2.1 Tesla $Fe_{44-46}Co_{39-41}Ni_{14.5-15}$, 1.8 Tesla $Fe_{54-56}Ni_{27-29}Co_{16-18}$ Tesla $Fe_{86-90}Cr_{10-14}$, or 1.9 Tesla $Fe_{52-62}Co_{26-36}Cr_{10-14}$, wherein the subscripts indicate a preferred range of atomic percentages for each element in the given alloy.

DETAILED DESCRIPTION

Figure 1:
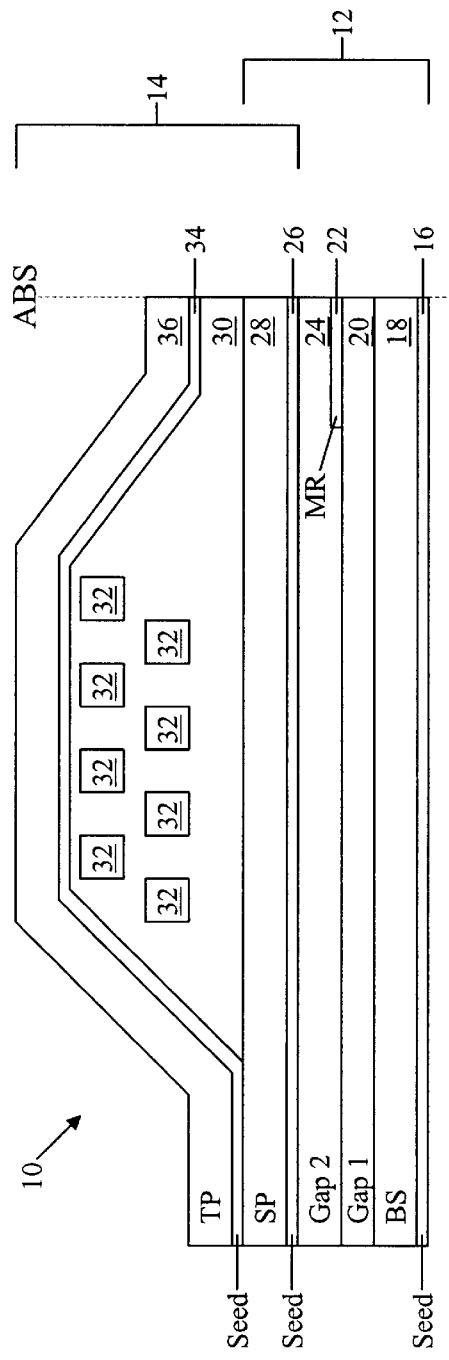
FIG. 1 is a cross-sectional view of a prior art transducing head taken along a plane normal to an air bearing surface of the transducing head.
Figure 2:
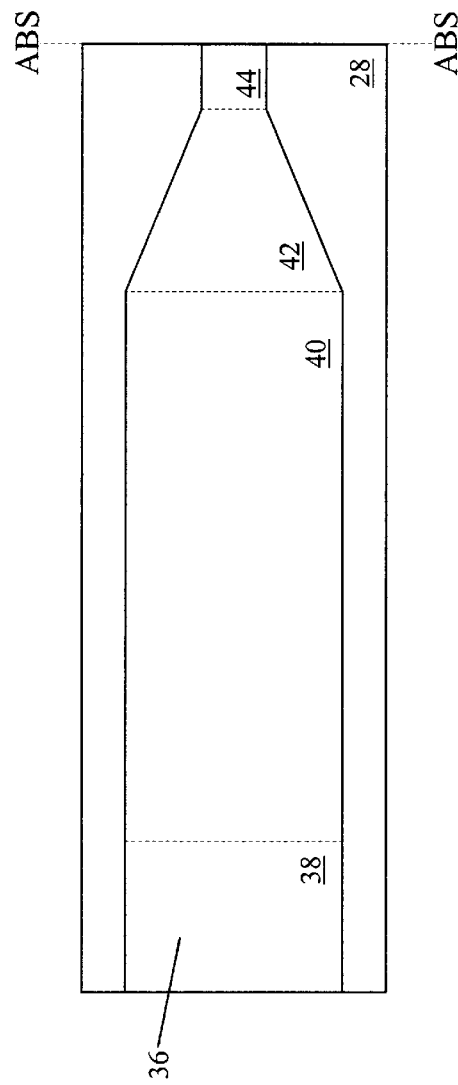
FIG. 2 is a top view of the prior art transducing head of FIG. 1.

FIG. 1 is a cross-sectional view of prior art transducing head 10 taken along a plane normal to air bearing surface (ABS) of transducing head 10. FIG. 2 is a top view of prior art transducing head 10. Transducing head 10 includes reader portion 12 and writer portion 14.

Reader portion 12 of transducing head 10 includes bottom shield seed layer 16, bottom shield 18, first gap layer 20, magnetoresistive (MR) read element 22, second gap layer 24, shared pole seed layer 26 and shared pole 28. A read gap is defined on the ABS between terminating ends of bottom shield 18 and shared pole 28. MR read element 22 is positioned between terminating ends of first gap layer 20 and second gap layer 24. First and second gap layers 20 and 24 are positioned between bottom shield 16 and shared pole 28. Bottom shield seed layer 16, upon which bottom shield 18 is layered, and shared pole seed layer 26, upon which shared pole 28 is layered, are each selected to promote the desired magnetic properties of respective bottom shield 18 and shared pole 28.

Writer portion 14 of transducing head 10 includes shared pole seed layer 26, shared pole 28, write gap layer 30, conductive coils 32, top pole seed layer 34 and top pole 36. A write gap is defined on the ABS by write gap layer 30 between terminating ends of shared pole 28 and top pole 36. Conductive coils 32 are positioned in write gap layer 30 between shared pole 28 and top pole 36, such that the flow of electrical current through conductive coils 32 generates a magnetic field across the write gap. Top pole seed layer 34, upon which top pole 36 is layered, is selected to promote the desired magnetic properties of top pole 36.

Transducing head 10 is a merged MR head in which shared pole 28 serves as both a top shield in reader portion 12 and a bottom pole of writer portion 14. If transducing head 10 were a piggyback MR head, the bottom pole and the top shield would be formed of two separate layers.

As illustrated better in FIG. 2, top pole 36 is patterned to channel magnetic flux toward the ABS of writer portion 14. Top pole 36 includes back via 38, paddle 40, neck 42, and pole tip 44. Back via 38, which extends through the center of conductive coils 32, connects top pole 36 to shared pole 28 to make a magnetic circuit between top pole 36 and shared pole 28. Paddle 40 is located between back via 38 and neck 42. Neck 42 is located between paddle 40 and pole tip 44. Pole tip 44 is located between the ABS and neck 42. A width of pole tip 44 is substantially narrower than a width of paddle 40. A width of neck 42 transitions from a width equal to the width of pole tip 44 to a width equal to the width of paddle 40.

The performance of writer portion 14 of transducing head 10 is strongly tied to the magnetic characteristics of top pole 36 and shared pole 28, which in turn are a function of the materials and processes used in the construction of top pole 36 and shared pole 28. In particular, it is necessary that the top pole 36 and shared pole 28 each have soft magnetic properties, such as a high permeability to increase the efficiency of writer 14, a high saturation magnetization to increase the strength of the write gap field, a high corrosion resistance to increase the life of writer 14, and a high resistivity to minimize eddy currents in shared and top poles 28 and 36.

In prior art transducing heads, top pole 36 and shared pole 28 are common formed of materials such as permalloy ($Ni_{81}Fe_{19}$), which has a relative permeability of approximately 1000 at 10 MHz and a saturation magnetization of approximately 1 Tesla, sendust ($Al_{5.4}Fe_{65}Si_{9.6}$), which has a permeability of approximately 1000 at 10 Mz and a saturation magnetization of approximately 1.1 Tesla or $Ni_{45}Fe_{55}$, which has a permeability of approximately 1000 at 10 MHz and a saturation magnetization of approximately 1.6 Tesla Although these materials proved useful in prior art transducing heads, recent demand for increased data storage densities require magnetic poles in writers to have a saturation magnetization in excess of those achieved in poles formed of purely permalloy or sendust. Prior attempts of using higher magnetic moment materials in forming the poles to increase the saturation magnetization of the writer poles have negatively impacted several of the other necessary properties of the writer, such as decreasing the permeability and/or the corrosion resistance of the poles, or resulting in less robust manufacturing processes necessary to build the transducing head.

The present invention recognizes that the use of a high magnetic moment material as a seed layer for just the pole tips will achieve the desired increase in flux density by increasing the saturation magnetization at the pole tips, without negatively affecting the permeability of the paddle portion of the writer. The present invention also recognizes several materials, such as $Fe_{45}Co_{40}Ni_{15}$, $Fe_{88}Cr_{12}$, $Fe_{57}Co_{31}Cr_{12}$, and $Fe_{55}Ni_{28}Co_{17}$, each which have a saturation magnetization of at least 1.8 T, a low coercivity force, and a relatively high corrosion resistance, are particularly useful as a seed layer for a writer pole tip.

Figure 3:
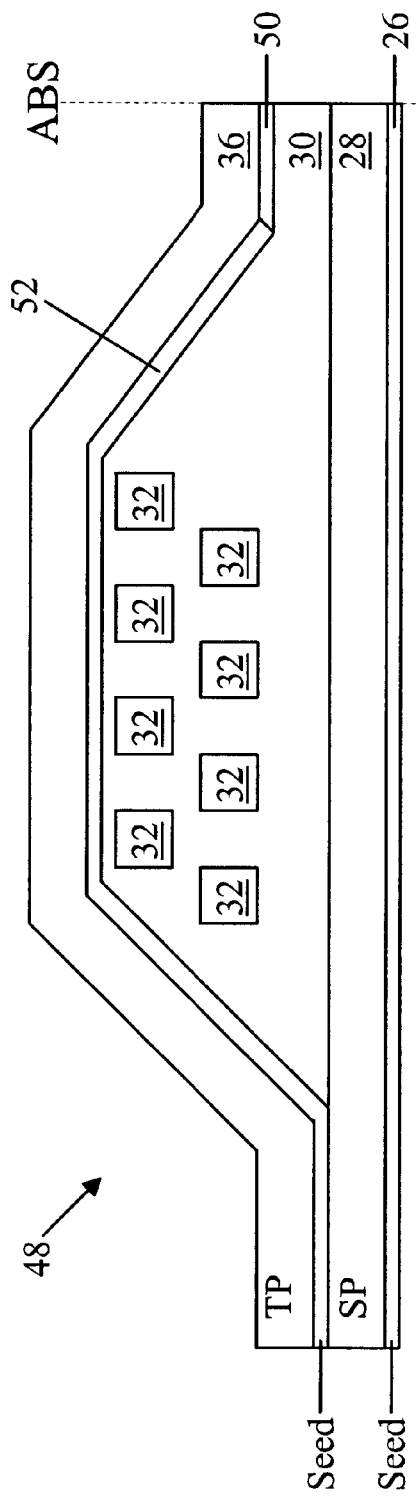
FIG. 3 is a cross-sectional view of a writer portion of a transducing head in accord with the present invention and having a high magnetic moment seed layer for a pole tip region of a top pole of the transducing head.

FIG. 3 is a cross-sectional view of writer 48 in accord with the present invention. Writer 48 differs from writer portion 14 of prior art transducing head 10 of FIGS. 1 and 2 in that top pole seed layer 34 of transducing head 10 is replaced with top pole seed layers 50 and 52. Top pole seed layer 50 is formed of a high magnetic moment material of the present invention; whereas, top pole seed layer 52 is formed of a conventional top pole seed layer material, such as $Ni_{45}Fe_{55}$. Top pole seed layer 50 is formed adjacent the ABS of writer 48, beneath pole tip 44 of top pole 36. Top pole seed layer 52 is formed beneath back via 38, paddle 40 and neck 42.

First Embodiment

In a first embodiment of the present invention, a seed layer of $Fe_{45}Co_{40}Ni_{15}$ is used as seed layer 50 for pole tip 44 of top pole 36. The atomic percentage of iron in $Fe_{45}Co_{40}Ni_{15}$ seed layer 50 is preferably in the range of about 44 to about 46, and most preferably equals about 45. The atomic percentage of cobalt in $Fe_{45}Co_{40}Ni_{15}$ seed layer 50 is preferably in the range of about 39 to about 41, and most preferably, equals about 40. The atomic percentage of nickel in $Fe_{45}Co_{40}Ni_{15}$ seed layer 50 is preferably in the range of about 14 to about 15, and most preferably, equals about 15.

This $Fe_{45}Co_{40}Ni_{15}$ alloy has a saturation magnetization of about 2.1 Tesla, which is significantly greater than materials used as seed layers for prior art writer poles. Use of $Fe_{45}Co_{40}Ni_{15}$ as seed layer 50 of writer 48 yields a writer having increased performance over prior art writers. The high magnetic moment of the $Fe_{45}Co_{40}Ni_{15}$ seed layer material allows for an increase in the strength of the write gap field, thus allowing for increased areal density.

Moreover, the addition of nickel to an FeCo alloy results in an alloy having significantly improved corrosion resistance. Tests by the inventors have shown that the corrosion resistance of the $Fe_{45}Co_{40}Ni_{15}$ alloy is comparable to $Fe_{55}Ni_{45}$(a conventional writer pole material). These tests subjected the $Fe_{45}Co_{40}Ni_{15}$ alloy to the most damaging environments encountered by a writer pole during fabrication of a transducing head, including plating, wet etching and machining. In each of these situations, this $Fe_{45}Co_{40}Ni_{15}$ alloy was found to be compatible with these environments, performing comparably to the $Fe_{55}Ni_{45}$alloy currently in production. Hence, $Fe_{45}Co_{40}Ni_{15}$ is found to be better in terms of both moment and corrosion resistance than prior art materials.

For successful use of the $Fe_{45}Co_{40}Ni_{15}$ alloy as a seed layer, it is desirable to further optimize the magnetic properties of the material. For instance, it has been determined by experiment that the coercivity of a sputter-deposited $Fe_{45}Co_{40}Ni_{15}$ alloy layer is dependent upon the sputter pressure used when depositing the layer. The table below illustrates the effect of sputter pressure during deposition of a $Fe_{45}Co_{40}Ni_{15}$ alloy layer on the coercivity $H_{CE}$ along the layer's easy axis, the coercivity $H_{CH}$ along the layer's hard axis and the initial permeability $I_{PT}$.

| Pressure (mTorr) | $H_{CE}$ (Oe) | $H_{CH}$ (Oe) | $I_{PT}$ (um) |
|---|---|---|---|
| 2 | 63 | 54 | 0.6 |
| 4 | 62 | 55 | 1.8 |
| 5 | 54 | 50 | 1.2 |
| 6 | 41 | 45 | 3.0 |
| 8 | 28 | 27 | 3.0 |
| 10 | 58 | 42 | 2.5 |

The data presented in the table above were obtained through multiple samples in which all of the deposition parameters except sputter pressure remained constant.

Specifically, the sputter power was set to 1000 watts, the sputtering time was set to 300 seconds and the current was set at 8 amperes.

Further, it has been determined that the coercivity of the $Fe_{45}Co_{40}Ni_{15}$ seed layer can be further reduced by supplying a $Ni_{51}Cr_{38}Fe_{11}$ under layer having a thickness of about 50 Å to about 200 Å thick beneath the $Fe_{45}Co_{40}Ni_{15}$ seed layer. The presence of this under layer may reduce the coercivity of the $Fe_{45}Co_{40}Ni_{15}$ seed layer from about 50 Oe to about 25 Oe. This reduction in coercivity occurs because the NiCrFe under layer results in the $Fe_{45}Co_{40}Ni_{15}$ seed layer having a higher bcc (110) texture. By achieving a higher bcc texture, the $Fe_{45}Co_{40}Ni_{15}$ seed layer will have better soft magnetic properties overall.

For successful use of the $Fe_{45}Co_{40}Ni_{15}$ alloy as a seed layer, it is desirable to further optimize the stress conditions of the layer. In particular, it is desirable to have tensile stress in these alloys to yield better soft magnetic properties. A high sputtering pressure will ensure that the layer undergoes tensile stress. Additionally, curing of the $Fe_{45}Co_{40}Ni_{15}$ seed layer will result in an increase in tensile stress and a reduction in coercivity.

Second Embodiment

In a second embodiment of the present invention, a seed layer of $Fe_{55}Ni_{28}Co_{17}$ is used as seed layer 50 for pole tip 44 of top pole 36. The atomic percentage of iron in $Fe_{55}Ni_{28}CO_{17}$ seed layer 50 is preferably in the range of about 54 to about 56, and most preferably equals about 55. The atomic percentage of nickel in $Fe_{55}Ni_{28}Co_{17}$ seed layer 50 is preferably in the range of about 27 to about 29, and most preferably, equals about 28. The atomic percentage of cobalt in $Fe_{55}Ni_{28}Co_{17}$ seed layer 50 is preferably in the range of about 16 to about 18, and most preferably, equals about 17.

This $Fe_{55}Ni_{28}Co_{17}$ alloy has a saturation magnetization of about 1.8 Tesla, which is greater than materials used as seed layers for prior art writer poles. Use of $Fe_{55}Ni_{28}Co_{17}$ as seed layer 50 of writer 48 yields a writer having increased performance over prior art writers.

The large atomic concentration of nickel in the $Fe_{55}Ni_{28}Co_{17}$ alloy results in a alloy having significant corrosion resistance, which is comparable to that of prior art seed layer materials.

As with the first embodiment, the magnetic properties of the $Fe_{55}Ni_{28}Co_{17}$ alloy are preferably optimized by adjusting and evaluating the various deposition parameters. As shown in the table below, the sputter pressure used to deposit the $Fe_{55}Ni_{28}Co_{17}$ seed layer greatly affects the coercivity $H_{CE}$ along the easy axis of the $Fe_{55}Ni_{28}Co_{17}$ seed layer, the coercivity $H_{CH}$ along the layer's hard axis and the layer's initial permeability $I_{PT}$.

| Pressure (mTorr) | $H_{CE}$ (Oe) | $H_{CH}$ (Oe) | $I_{PT}$ (um) |
|---|---|---|---|
| 3 | 50 | 47 | 3.0 |
| 5 | 35 | 33 | 5.8 |
| 7 | 31 | 28 | 7.2 |
| 10 | 27 | 22 | 3.8 |
| 12 | 28 | 23 | 4.1 |
| 15 | 33 | 25 | 5.1 |

The data presented in the table above were obtained through multiple samples in which all of the deposition parameters except sputter pressure remained constant. Specifically, the sputter power was set to 1000 watts, the sputtering time was set to 500 seconds and the current was set at 6 amperes.

Third Embodiment

In the third embodiment of the present invention, a seed layer of $Fe_{88}Cr_{12}$ layer is used as seed layer 50 for pole tip 44 of top pole 36. The atomic percentage of iron in $Fe_{88}Cr_{12}$ seed layer 50 is preferably in the range of about 86 to about 90, and most preferably equals about 88. The atomic percentage of chromium in $Fe_{88}Cr_{12}$ seed layer 50 is preferably in the range of about 10 to about 14, and most preferably equals about 12.

This $Fe_{88}Cr_{12}$ alloy has a saturation magnetization of about 1.8 Tesla, which is greater than materials used as seed layers for prior art writer poles. Use of $Fe_{88}Cr_{12}$ as seed layer 50 of writer 48 yields a writer having increased performance over prior art writers. The high magnetic moment of the $Fe_{88}Cr_{12}$ seed layer material allows for an increase in the strength of the write gap field, thus allowing for increased areal density. The addition of chromium to iron results in an alloy having significantly improved corrosion resistance over pure iron.

Fourth Embodiment

In a fourth embodiment of the present invention, a seed layer of $Fe_{57}Co_{31}Cr_{12}$ is used as seed layer 50 for pole tip 44 of top pole 36. The atomic percentage of iron in $Fe_{57}Co_{31}Cr_{12}$ seed layer 50 is preferably in the range of about 52 to about 62, and most preferably equals about 57. The atomic percentage of cobalt in $Fe_{57}Co_{31}Cr_{12}$ seed layer 50 is preferably in the range of about 26 to about 36, and most preferably, equals about 31. The atomic percentage of chromium in $Fe_{57}Co_{31}Cr_{12}$ seed layer 50 is preferably in the range of about 10 to about 14, and most preferably, equals about 12.

This $Fe_{57}Co_{31}Cr_{12}$ alloy has a saturation magnetization of about 1.9 Tesla, which is greater than materials used as seed layers for prior art writer poles. Use of $Fe_{57}Co_{31}Cr_{12}$ as seed layer 50 of writer 48 yields a writer having increased performance over prior art writers. The addition of chromium to the FeCo alloy results in an alloy having significantly improved corrosion resistance.

CONCLUSION

The present invention recognizes that the use of a high magnetic moment material as a seed layer for just the pole tips of a writer will increase in data storage capabilities of the writer. The use of the high magnetic moment seed layer allows for an increase in flux density by increasing the saturation magnetization at the pole tips of the writer, without negatively affecting the permeability of the paddle portion of the writer. The present invention also recognizes several materials, such as $Fe_{45}Co_{40}Ni_{15}$, $Fe_{88}Cr_{12}$, $Fe_{57}Co_{31}Cr_{12}$, and $Fe_{55}Ni_{28}Co_{17}$, each which have a saturation magnetization of at least 1.8 T, a low coercivity force, and a relatively high corrosion resistance, are each particularly useful as a seed layer for a writer pole tip.

Although only the top pole is discussed above, it is understood that the various seed layer materials disclosed may be used as a seed layer for the tip of shared pole 28 as well.

Although the present invention has been described with reference to preferred embodiments, workers skilled in the art will recognize that changes may be made in form and detail without departing from the spirit and scope of the invention.

What is claimed is:

1. In a magnetic recording head, an improvement comprising:
   a writer pole having a paddle portion, a tip portion and a neck portion, the neck portion positioned between the paddle portion and the tip portion;

a first seed layer upon which the paddle portion and the neck portion are formed, the first seed layer being formed of a magnetic material having a permeability of at least 1000; and a second seed layer upon which the tip portion is formed, the second seed layer being formed of a magnetic material having a saturation magnetization of at least 1.8 Tesla.

2. The magnetic recording head of claim 1 wherein the magnetic material of the second seed layer is FeCoNi, wherein an atomic percentage of iron is in the range of about 44 to about 46, an atomic percentage of cobalt is in the range of about 39 to about 41, and an atomic percentage of nickel is in the range of about 14 to about 15.

3. The magnetic recording head of claim 1 wherein the magnetic material of the second seed layer is FeCoNi, wherein an atomic percentage of iron is about 45, an atomic percentage of cobalt is about 40, and an atomic percentage of nickel is about 15.

4. The magnetic recording head of claim 1 wherein the magnetic material of the second seed layer is FeNiCo, wherein an atomic percentage of iron is in the range of about 54 to about 56, an atomic percentage of nickel is in the range of about 27 to about 29 and an atomic percentage of cobalt is in the range of about 16 to about 18.

5. The magnetic recording head of claim 1 wherein the magnetic material of the second seed layer is FeNiCo, wherein an atomic percentage of iron is about 55, an atomic percentage of nickel is about 28 and an atomic percentage of cobalt is about 17.

6. The magnetic recording head of claim 1 wherein the magnetic material of the second seed layer is FeCr, wherein an atomic percentage of iron is in the range of about 86 to about 90 and an atomic percentage of chromium is in the range of about 10 to about 14.

7. The magnetic recording head of claim 1 wherein the magnetic material of the second seed layer is FeCr, wherein an atomic percentage of iron is about 88 and an atomic percentage of chromium is 12.

8. The magnetic recording head of claim 1 wherein the magnetic material of the second seed layer is FeCoCr, wherein an atomic percentage of iron is in the range of about 52 to about 62, an atomic percentage of cobalt is in the range of about 26 to about 36, and an atomic percentage of chromium is in the range of about 10 to about 14.

9. The magnetic recording head of claim 1 wherein the magnetic material of the second seed layer is FeCoCr, wherein an atomic percentage of iron is about 57, an atomic percentage of cobalt is about 31, and an atomic percentage of chromium is about 12.

10. The magnetic recording head of claim 1 and further comprising an under layer upon which the second seed layer is formed.

11. The magnetic recording head of claim 10 wherein the under layer is formed of NiCrFe, wherein an atomic percentage of nickel is about 51, an atomic percentage of chromium is about 38 and an atomic percentage of iron is about 11.

12. In a writer pole having a paddle portion, a tip portion and a neck portion positioned between the paddle portion and the tip portion, an improvement comprising:

a first seed layer upon which the paddle portion and the neck portion are formed, the first seed layer being formed of a thin magnetic film having a permeability of at least 1000; and a second seed layer upon which the tip portion is formed, the second seed layer being formed of a thin magnetic film selected from the group comprising:

$Fe_aCo_bNi_c$, $Fe_dNi_eCo_f$, $Fe_gCr_h$, $Fe_iCo_jCr_k$, and wherein a, b, c, d, e, f, g, h, i, j, and k represent atomic percentages of the elements, and wherein $44 \leq a \leq 46$, $39 \leq b \leq 41$, $14 \leq c \leq 15$, $a+b+c=100$, $54 \leq d \leq 56$, $27 \leq e \leq 29$, $16 \leq f \leq 18$, $d+e+f=100$, $86 \leq g \leq 90$, $10 \leq h \leq 14$, $f+g=100$, $52 \leq i \leq 62$, $26 \leq j \leq 36$, $10 \leq k \leq 14$, and $i+j+k=100$.

13. The second seed layer of claim 12 wherein a=45, b=40 and c=15.

14. The second seed layer of claim 12 wherein d=55, e=28 and f=17.

15. The second seed layer of claim 12 wherein g=88 and h=12.

16. The second seed layer of claim 12 wherein i=57, j=31 and k=12.

17. The writer pole of claim 12 and further comprising an under layer upon which the second seed layer is formed.

18. The writer pole of claim 17 wherein the under layer is formed of NiCrFe, wherein an atomic percentage of nickel is about 51, an atomic percentage of chromium is about 38 and an atomic percentage of iron is about 11.

19. In a magnetic recording head, an improvement comprising:

a writer pole having a paddle portion, a tip portion and a neck portion, the neck portion positioned between the paddle portion and the tip portion; and means for increasing the magnetic moment of the tip portion of the writer pole without increasing the magnetic moment of the paddle portion or the neck portion of the writer pole.

20. The magnetic recording head of claim 19 wherein the means for increasing the magnetic moment of the tip portion without increasing the magnetic moment of the paddle portion or the neck portion includes:

a first seed layer upon which the paddle portion and the neck portion are formed; and a second seed layer upon which the tip portion is formed.

21. The magnetic recording head of claim 20 wherein the first seed layer is formed of a magnetic material having a permeability of at least 1000 and the second seed layer is formed of a magnetic material having a saturation magnetization of at least 1.8 Tesla.

22. The magnetic recording head of claim 21 wherein the magnetic material of the second seed layer is FeCoNi, wherein an atomic percentage of iron is in the range of about 44 to about 46, an atomic percentage of cobalt is in the range of about 39 to about 41, and an atomic percentage of nickel is in the range of about 14 to about 15.

23. The magnetic recording head of claim 21 wherein the magnetic material of the second seed layer is FeNiCo, wherein an atomic percentage of iron is in the range of about 54 to about 56, an atomic percentage of nickel is in the range of about 27 to about 29 and an atomic percentage of cobalt is in the range of about 16 to about 18.

24. The magnetic recording head of claim 21 wherein the magnetic material of the second seed layer is FeCr, wherein an atomic percentage of iron is in the range of about 86 to about 90 and an atomic percentage of chromium is in the range of about 10 to about 14.

25. The magnetic recording head of claim 21 wherein the magnetic material of the second seed layer is FeCoCr, wherein an atomic percentage of iron is in the range of about 52 to about 62, an atomic percentage of cobalt is in the range of about 26 to about 36, and an atomic percentage of chromium is in the range of about 10 to about 14.

* * * * *